(12) United States Patent
Hosaka et al.

(10) Patent No.: US 9,664,169 B2
(45) Date of Patent: May 30, 2017

(54) ENGINE STARTING CONTROL DEVICE FOR A VEHICLE WITH MANUAL TRANSMISSION

(71) Applicant: Nissan Motor Co., Ltd., Yokohama-shi, Kanagawa (JP)

(72) Inventors: Yuuichi Hosaka, Kanagawa (JP); Hiromoto Shimizu, Kanagawa (JP); Munemitsu Watanabe, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 15/026,995

(22) PCT Filed: Dec. 6, 2013

(86) PCT No.: PCT/JP2013/082828
§ 371 (c)(1),
(2) Date: Apr. 4, 2016

(87) PCT Pub. No.: WO2015/083286
PCT Pub. Date: Jun. 11, 2015

(65) Prior Publication Data
US 2016/0230736 A1 Aug. 11, 2016

(51) Int. Cl.
*F02N 11/10* (2006.01)
*F02D 29/02* (2006.01)

(52) U.S. Cl.
CPC .......... *F02N 11/103* (2013.01); *F02D 29/02* (2013.01); *F02N 2200/103* (2013.01)

(58) Field of Classification Search
CPC .............. F02N 11/101; F02N 11/103; F02N 2200/103; F02D 29/02
See application file for complete search history.

(56) References Cited

U.S. PATENT DOCUMENTS

2008/0312035 A1* 12/2008 Murayama ............ B60W 30/19
477/110
2013/0124072 A1* 5/2013 Hirano .................... F02D 17/04
701/112

FOREIGN PATENT DOCUMENTS

| DE | 102 51 765 A1 | 5/2004 |
| JP | 2002-364404 A | 12/2002 |
| JP | 2008-240606 A | 10/2008 |

(Continued)

*Primary Examiner* — Jacob S Scott
(74) *Attorney, Agent, or Firm* — Global IP Counselors, LLP

(57) ABSTRACT

An engine start control system includes a manual transmission, an upper switch, a lower switch, and an engine start control unit. The upper switch detects a pedal depression start operation by detecting a resting foot state from a foot released state. The lower switch detects a pedal depression terminating operation when the clutch pedal is depressed to an end position. The engine start control unit is configured to start the engine from a stopped state when signals of the upper switch indicates the pedal depression start operation and of the lower switch indicates the pedal depression terminating operation, and the engine start control unit being configured to prohibit starting of the engine, when the signal of the upper switch indicates switching from the foot released state to the pedal depression start operation, in response to detection of the signal of the lower switch indicating the pedal depression terminating operation.

6 Claims, 6 Drawing Sheets

(56) References Cited

FOREIGN PATENT DOCUMENTS

| | | |
|---|---|---|
| JP | 2009-52438 A | 3/2009 |
| JP | 2010-48163 A | 3/2010 |
| JP | 2010-48164 A | 3/2010 |
| JP | 2011-69303 A | 4/2011 |
| JP | 2012-92669 A | 5/2012 |
| JP | 2013-204451 A | 10/2013 |
| WO | 2012/095733 A1 | 7/2012 |

* cited by examiner

ENGINE STARTING CONTROL DEVICE FOR A VEHICLE WITH MANUAL TRANSMISSION

CROSS-REFERENCE TO RELATED APPLICATIONS

This application is a U.S. National Stage application of International Application No. PCT/JP2013/082828, filed Dec. 6, 2013, the contents of which is hereby incorporation herein by reference.

BACKGROUND

Field of Invention

The present invention relates to an engine start control system for a vehicle installed or equipped with a manual transmission, which performs an engine start control using two switches for detecting an operation state of a clutch pedal.

Background Information

Conventionally, a system for automatically restarting an engine is known, in which, after the engine is stopped, when a clutch of a manual transmission is in a released state (non-transmitting state of power) due to a clutch pedal operation, engine cranking is permitted (for example, see JP 2008-240606 A).

PRIOR ART SUMMARY

However, in the conventional system, it is determined, primarily by two clutch switches (clutch upper switch and clutch lower switch), whether the power transmitting state or power non-transmitting state (clutch upper switch ON and clutch lower switch ON) is in place. Thus, a problem arises in which, if the clutch lower switch is in "ON" failure, upon the driver operating the clutch in the half-clutch condition (i.e., only clutch upper switch is ON), engine cranking is started so that the vehicle will start to move due to the cranking operation.

The present invention has been made in view of the above problem and aims to provide an engine start control system for a manual transmission equipped vehicle which may prevent the vehicle from starting to move during the clutch lower switch being ON stuck or fixation failure even when the driver operates the clutch in a half-clutch state.

In order to achieve the above object, the engine start control device for a vehicle equipped with the manual transmission according to the present invention comprises a manual transmission, a clutch upper switch, a clutch lower switch, and an engine start control unit.

The manual transmission has a clutch for interrupting the power transmission to drive wheels from the engine by depression of the clutch pedal.

The clutch upper switch detects a pedal depression start operation when a foot is resting on the pedal from a clutch pedal released condition.

The clutch lower switch detects a pedal depression terminating operation when the clutch pedal is stroked (pressed) to the end position thereof.

The engine starting control unit is configured to start the engine, while the engine is in the stopped state, when the switch signal of the clutch upper switch represents a signal indicating the pedal depression start signal and the switch signal of the clutch lower switch represents a signal indicating the pedal depression terminating operation.

In the engine start control system for the manual transmission-equipped vehicle, the engine start control unit is configured to prevent the engine from being started, at the time in which the switch signal of the clutch upper switch indicates a switch or change from the foot released condition indicative signal to the pedal depression start operation indicative signal, when the pedal depression terminating operation is detected by the clutch lower switch.

Therefore, when the engine is in the stopped state, upon detection of switching or shift of the switch signal of the clutch upper switch from the foot released condition indicative signal to the pedal depression start indicative signal, when the pedal depression terminating operation indicative signal is detected, the engine start will be prohibited.

In other words, when the clutch upper switch and the clutch lower switch are normal, such a response sequence is established in which, in response to a clutch pedal operation releasing the clutch of the drive system, the clutch upper switch reacts or responds earlier, and the clutch lower switch responds with a delay. Thus, if the switch signal is detected indicating the pedal depression terminating operation by the clutch lower switch at the response timing of the clutch upper switch does not indicate normal response sequence due to the proper transition in switching conditions and "ON" failure of the clutch lower switch is determined. Thus, based on the ON failure determination in view of the response sequence of two switches, the engine start is prohibited. Therefore, the vehicle will be prevented from starting to move by an engine cranking in half-clutch state enabling a power transmission.

As a result, i.e., at the time of the ON failure of the clutch lower switch, it is possible to prevent the vehicle from being started even when the driver operates the clutch in the half-clutch state.

BRIEF DESCRIPTION OF THE DRAWINGS

Referring now to the attached drawings which form a part of this original disclosure.

DETAILED DESCRIPTION OF THE EMBODIMENTS

Figure 1:
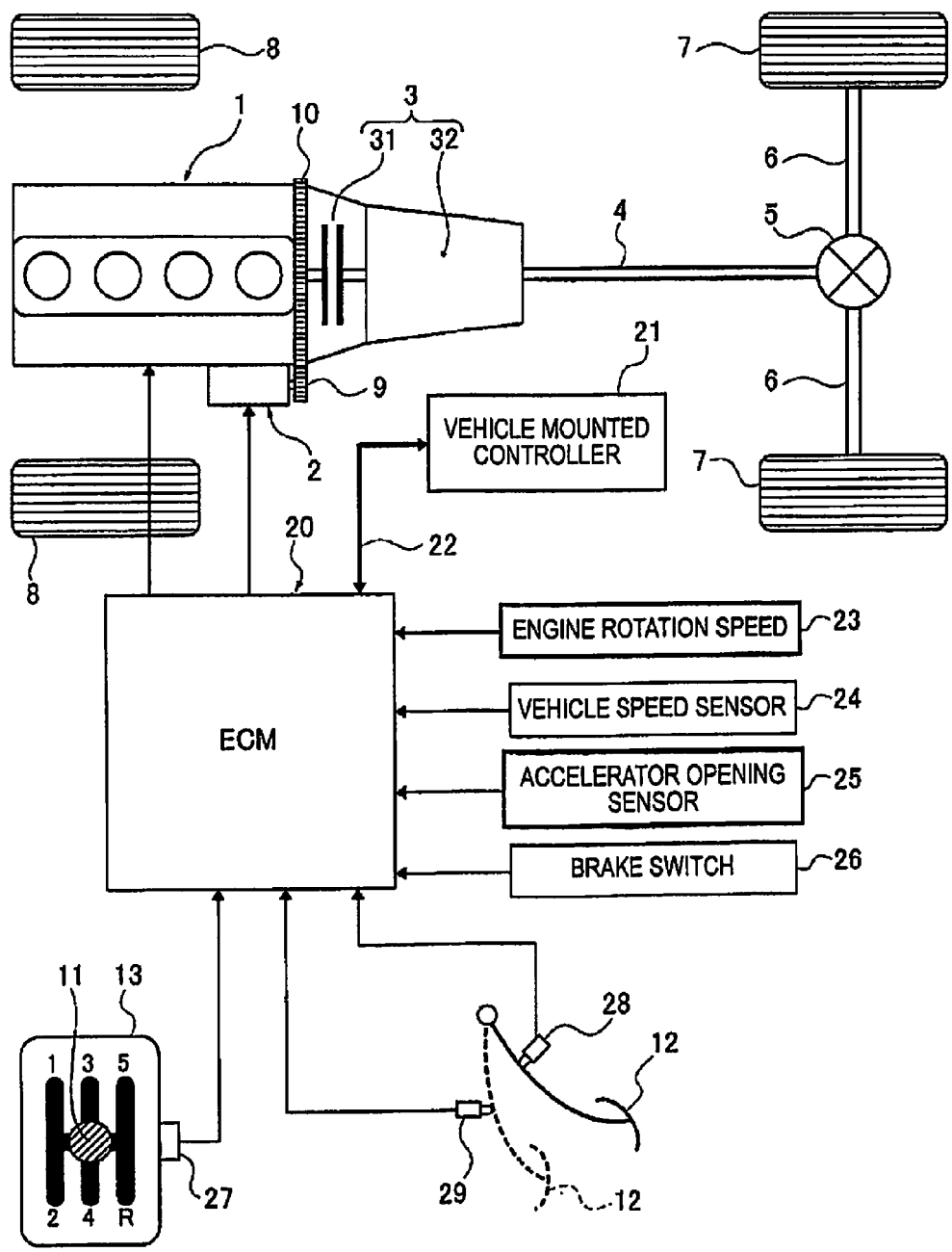
FIG. 1 is an overall system diagram showing a first embodiment of an engine start control system which is applied to an engine vehicle equipped with a manual transmission (an example of a manual transmission equipped vehicle)

Below, a description is given of the best mode for implementing the engine start control system for a manual transmission equipped vehicle according to the present invention with reference to the first embodiment shown in the drawings.

First Embodiment

First, a description is given of a configuration.

The configuration of an engine start control system for a manual transmission equipped engine vehicle (an example of a manual transmission equipped vehicle) in the first embodiment is described separately in the "overall system configuration" and the "engine start control configuration."

Overall System Configuration

FIG. 1 shows an engine start control system applied to a manual transmission equipped engine vehicle (an example of a manual transmission equipped vehicle). Below, with reference to FIG. 1, a description will be given of the overall system configuration.

The manual transmission equipped engine vehicles, as shown in FIG. 1, includes an engine 1, a starter motor 2, a manual transmission 3, a propeller shaft 4, a differential gear 5, left and right drive shafts 6, left and right drive wheels 7, and left and right driven wheels 8.

A motor gear 9 disposed on a motor shaft of the starter motor 2 meshes with a crank gear 10 on a crankshaft of the engine 1. Further, when the engine is restarted, the engine 1 is cranked by a motor drive command from the engine control unit 20, which is described below.

The manual transmission 3 is operative as a transmission which switches a gear position by manual operation of a shift lever 11, and has a clutch 31 and a gear transmission mechanism 32. The clutch 31 is a normally closed clutch that maintains the engaged condition when not operated by the urging force such as a diaphragm spring on the clutch pedal 12, whereas the clutch 31 is disconnected by depression on the clutch pedal 12 to allow to cut off the power transmission from the engine 1 to the left and right drive wheels 7. The gear transmission mechanism 32, for example, is a mechanism for selecting forward five-speed gear positions, one reverse gear position and a neutral position by operation of the shift lever 11. Further, when the clutch 31 is in an engagement state or half-engagement state (half-clutch state) and the gear shift position is in a gear position other than the neutral position, power from the engine 1 is transmitted to the left and right drive wheels 7 via the clutch 31 and the gear transmission mechanism 32. Note that the position of the shift lever 11 shown in FIG. 1 indicates a neutral position.

The control system of the engine 1, as shown in FIG. 1, includes an engine control unit 20, a vehicle mounted controller 21, a CAN communication line 22, an engine speed sensor 23, a vehicle speed sensor 24, an accelerator opening sensor 25 and a brake switch 26. As switches for use in the engine restart control, the neutral switch 27 (neutral detection means), the clutch upper switch 28, and the clutch lower switch 29 are provided.

The engine control unit 20 performs a control for determining stopping of the engine 1, and an engine restart control to restart the engine by cranking during engine stop when engine restart conditions are satisfied. The engine control unit 20 is connected to another vehicle mounted controller 21 via CAN communication line 22 for information exchange. Further, the engine rotation speed sensor 23, the vehicle speed sensor 23, and the accelerator opening sensor 25, and the brake switch 26 are connected. In addition, information necessary for control will be input from the vehicle mounted controller 21, the engine rotation speed sensor 23, the vehicle speed sensor 24, the accelerator opening sensor 25, the brake switch, and the like.

The neutral switch 27 is intended as a switch to detect whether or not the gear shift mechanism 32 of the manual transmission 3 is in the neutral position. The neutral switch 27 is disposed on a shift lever operation portion 13 having a lever guide slot of the shift lever 11. For example, when the shift lever 11 is in the neutral position shown in FIG. 1, an ON signal is output, while in a position other than the neutral position an OFF signal is output.

The clutch upper switch 28 is disposed on the vehicle body upper side of the clutch pedal 12, and intended as a switch for detecting the pedal depression start operation by placing the foot from the foot released state of the clutch pedal 12. When the foot is put on the clutch pedal 12, a switch signal of the clutch upper switch 28 is switched or changed to a signal indicative of the pedal depression start operation (for example, switch OFF signal) from the foot released state indicative signal (for example, switch ON signal). Note that, below, the foot released state may refer to "OFF (released) state2, and the pedal depression start state may refer to "ON (depression) state. Therefore, the expression of the opposite relationship from the ON/OFF states of the switch signals.

The clutch lower switch 29 is disposed on the vehicle body at the lower portion side of the clutch pedal 12, and is intended as a switch for detecting the pedal depression terminating operation when the clutch pedal 12 is stroked up to the end position of. When the depression stroke of the clutch pedal 12 increases, a switch signal indicating the pedal depression intermediate operation (e.g. switch OFF signal) is switched to a signal indicating the pedal depression terminating operation (e.g. switch ON signal). In the following description, the pedal depression intermediate operation state is referred to as "OFF (released) state", whereas the pedal depression terminating operation state is referred to as "ON (depression)" state so that these are expressed in the same corresponding relation as the ON/OFF of the switch signal.

Engine Restart Control Configuration

Figure 2:
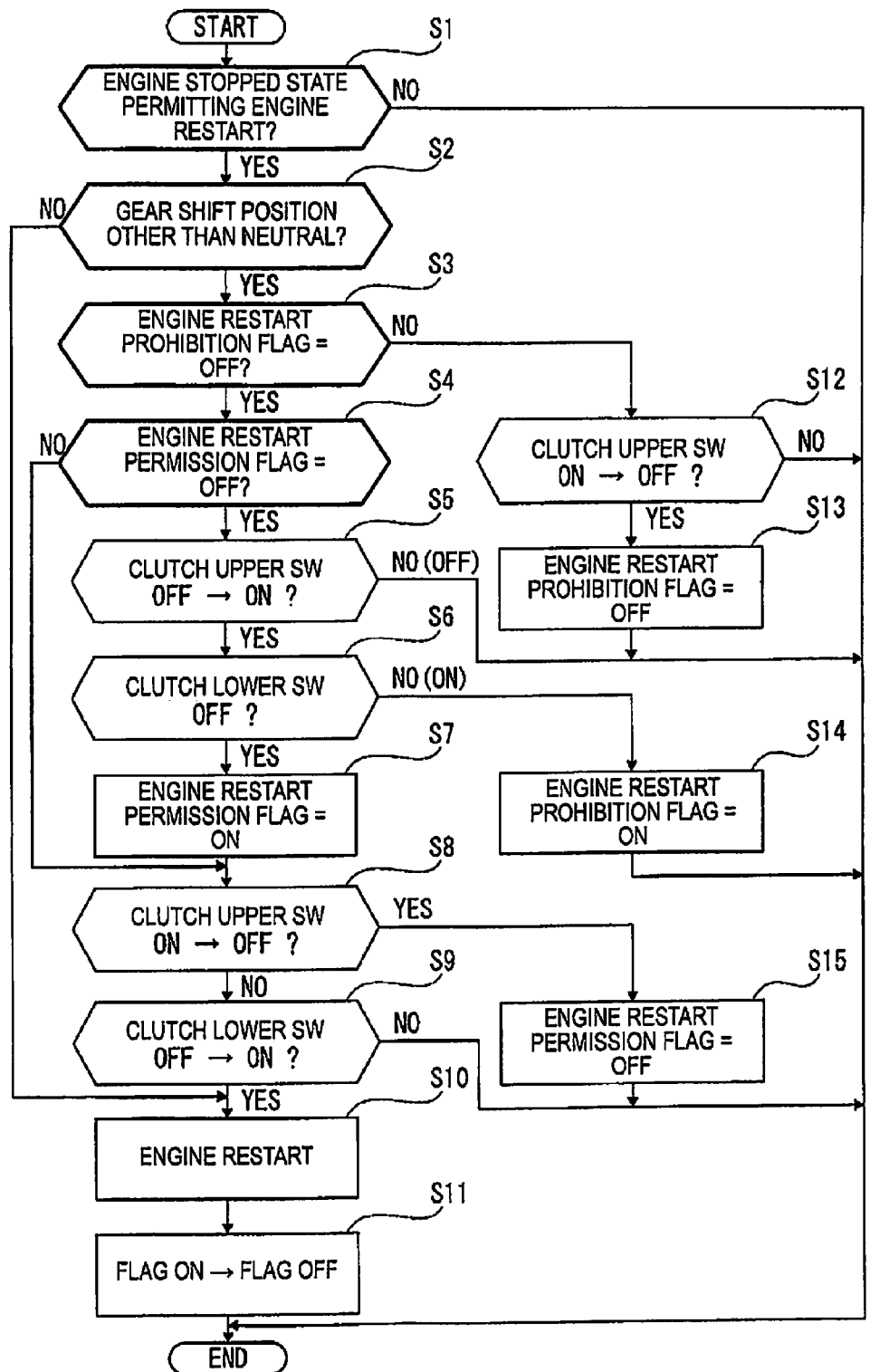
FIG. 2 is a flow chart showing the flow of the engine restart control process from an engine stopped state, which is performed by the engine control unit of the first embodiment.

FIG. 2 shows the flow of the engine restart control process executed by the engine control module 20 from an idle stop state in the first embodiment (engine start control mechanism). Below, a description is made of each step of FIG. 2 illustrating the engine restart control process with reference to FIGS. 3 to 5. Note that the process is initiated by detection of the engine stop condition, and is repeatedly executed in a predetermined control cycle (e.g. 10 msec).

In step S1, it is determined whether or not an engine stopped state which permits an engine restart is in place. If YES (engine stopped state permitting engine restart), control advances to step S2. In the case of NO (engine stopped state in which engine restart is not permitted), control ends. Here, the engine stopped state permitting the engine restart refers to a state in which conditions such as that the driver is present on the driver's seat, the battery charge state enabling engine restart, and hood and door are closed are all satisfied.

In step S2, subsequent to the judgment that the engine stopped state permitting engine restart is in place, based on the switch signal of the neutral switch 27, it is determined whether or not the gear shift position is in a position other than neutral position. If YES (non-neutral position), control advances to step S3, while, if NO (neutral position), control advances to step S10.

In step S3, subsequent to the judgement of a non-neutral position in step S2, it is determined whether or not an engine restart prohibition flag is OFF. If YES (engine restart prohibition flag is OFF), control advances to step S4, while, if NO (engine restart prohibition flag ON), control advances to step S8.

In step S4, subsequent to the judgment of the engine restart prohibition flag being OFF in step S3, it is determined whether or not the engine restart permission flag is OFF. If YES (engine start permission flag OFF), control proceeds to step S5. In the case of NO (engine restart permission flag=ON), control proceeds to step S8.

In step S5, subsequent to the judgment of the engine restart permission flag being OFF in step S4, based on the switch signal from the clutch upper switch 28, it is determined whether or not the foot released state (OFF state) has been changed to the pedal depression start state (ON). If determined YES (OFF→ON with the pedal depression start operation), control advances to step S6. In the case of NO (OFF state remains due to foot released state), control ends.

Figure 3:
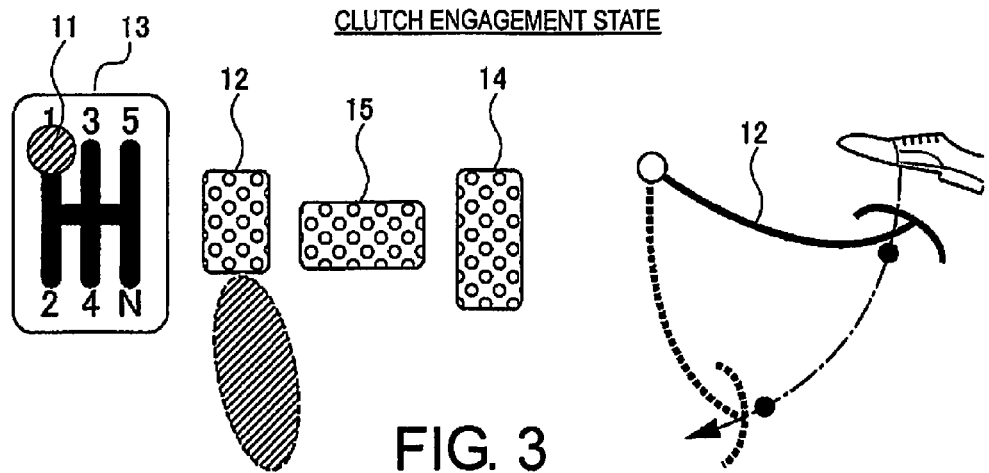
FIG. 3 is an explanatory diagram showing a clutch engagement operation in which the foot is released from the clutch pedal in a gear shift position other than the neutral position of the manual transmission for the engine vehicle.
Figure 4:
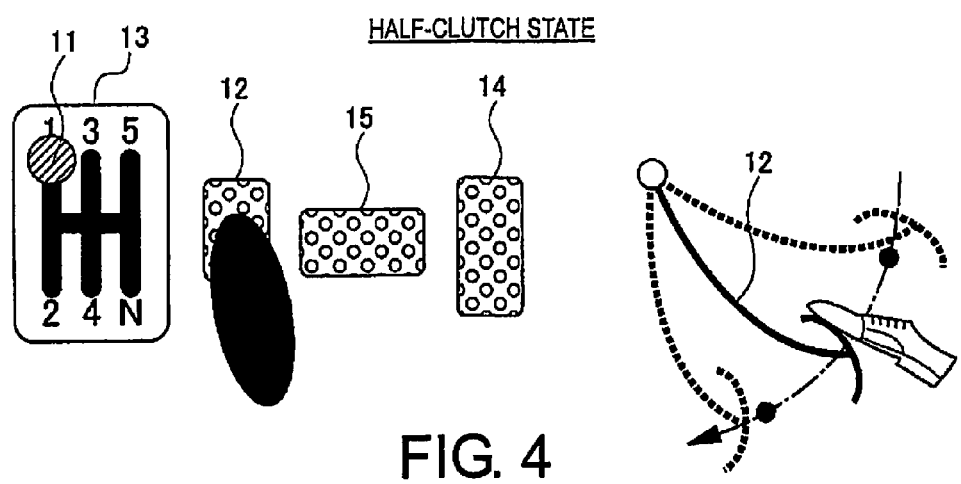
FIG. 4 is an explanatory diagram showing a half-clutch operation state in which the clutch pedal is slightly depressed in a gear shift position other than the neutral position of the manual transmission for the engine vehicle.

Here, with respect to the clutch pedal 12, when the foot released state (=clutch engagement state) shown in FIG. 3 moves to the pedal depression start operation (=half-clutch state) shown in FIG. 4, OFF state is changed to ON state accompanied by the pedal depression operation. Note that the accelerator pedal is illustrated by a reference numeral 14 and the brake pedal is shown by a reference numeral 15 in FIGS. 3-5.

In step S6, subsequent to the judgment of the OFF→ON with the pedal depression start operation at step S5, based on the switch signal of the clutch lower switch 29, it is determined whether or not the pedal depression intermediate operation state (OFF) is in place. If YES (pedal depression intermediate operation state), control proceeds to step S7, whereas, if NO (pedal depression terminating operation state), control proceeds to step S14.

In step S7, subsequent to the judgment of the pedal depression halfway operation states, OFF in step S6, the engine restart permission flag for permitting restart of the engine 1 is rewritten from the engine restart permission flag OFF to the engine restart permission flag ON, and control proceeds to step S8.

In step S8, subsequent to rewriting to the engine restart permission flag ON in step S7 or the judgement of engine restart permission flag ON in step S4, based on the switch signal of the clutch upper switch 28, it is determined whether or not the pedal depression start state (ON state) has changed to the foot released state (OFF state). If YES (ON to OFF along with foot returning operation), control proceeds to step S15. If NO (pedal depression start operation remains ON), control proceeds to step S9. Here, with respect to the clutch pedal 12, when the pedal depression start operation state (half-clutch state) shown in FIG. 4 transitions to the foot released state (clutch engagement state) shown in FIG. 3, the ON state will be changed to OFF state associated with clutch returning operation.

In step S9, following the determination that the pedal depression start operation state remains ON, based on the switch signal of the clutch lower switch 29, it is determined whether or not the pedal depression halfway operation state (OFF state) has switched to the pedal depression terminating operation state (ON state). If Yes (pedal depression terminating operation OFF to ON), the process proceeds to step S10. In the case of NO (pedal depression halfway operation state remains OFF, control ends.

Figure 5:
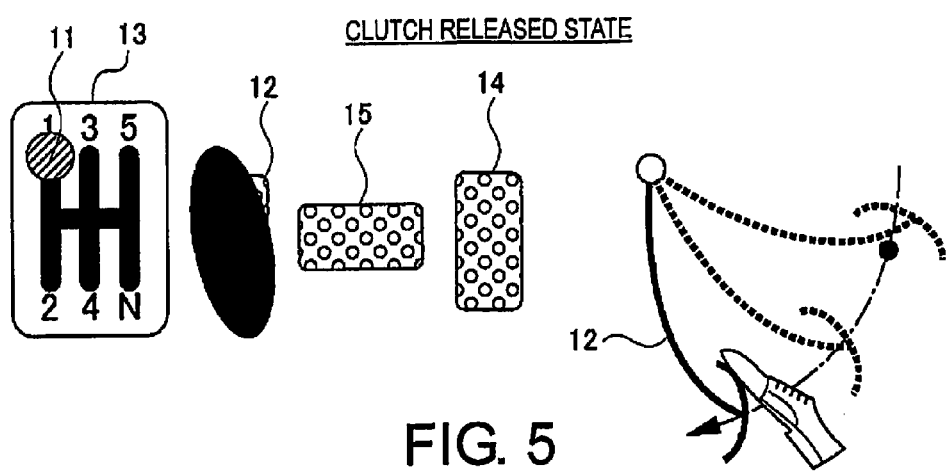
FIG. 5 is an explanatory diagram showing a clutch releasing operation state in which the clutch pedal is depressed to the end position engagement operation in a gear shift position other than the neutral position of the manual transmission for the engine vehicle.

Here, with respect to the clutch pedal 12, when the pedal depression halfway operation state (=half-clutch state) in FIG. 4 transitions to the pedal depression terminating operation state (=clutch released state) in FIG. 5, the pedal depression terminating operation state is changed from OFF to ON.

In step S10, subsequent to the judgment that the pedal depression terminating operation being changed from OFF to ON state in step S9, or the gear shift position remains in neutral position in step S2, by outputting a motor drive command to the starter motor 2, the engine 1 is restarted by cranking, and control proceeds to step S11.

In step S11, following the engine restart at step S10, when the engine restart prohibition flag or the engine restart permission flag is ON, both flags are rewritten and initialized to OFF, and the process ends.

In step S12, subsequent to the judgment of the engine restart prohibition flag=ON in step S3, based on the switch signal of the clutch upper switch 28, in response to a switch signal of the clutch upper switch 28, it is determined whether or not the pedal depression start operation state (ON state) has changed to the foot released state (OFF state). If YES (ON→OFF by the pedal returning operation), the process advances to step S13. In the case of NO (pedal depression start operation state ON), the process ends.

Here, as in step S8, with respect to the clutch pedal 12, when the pedal depression start operation state (=half-clutch state) shown in FIG. 4 shifts to the foot released state (=clutch engagement state) shown in FIG. 3, ON state is turned to OFF state accompanied by the pedal returning operation.

In step S13, subsequent to the judgment from ON to OFF accompanied by pedal returning operation in step S12, the engine restart prohibition flag is rewritten from the engine restart prohibition flag being ON to the engine restart prohibition flag OFF, and control ends.

In step S14, subsequent to the judgment that the pedal depression termination operation state is ON in step S6, the engine restart prohibition flag is rewritten from the engine restart prohibition flag OFF to the engine restart prohibition flag OFF, and control ends.

In step S15, subsequent to the judgment of OFF state from ON state accompanied by pedal returning operation in step S8, the engine restart permission flag is rewritten from the engine restart permission flag On to the engine restart permission flag OFF, and control ends.

Now, a description is given of the operation.

The operation in the engine start control system in the manual transmission equipped engine vehicle is described separately in "Problem of Comparative Example", "Engine restart control operation at normal time", "Engine restart control operation at the time of ON fixation failure of the clutch lower SW Control", and "Characteristic operation of the engine restart control".

Problem of Comparative Example

A Comparative Example is assumed in which, when the clutch upper switch indicates the pedal depression start operation and the clutch lower switch indicates the pedal depression terminating operation, engine will be restarted.

Figure 6:
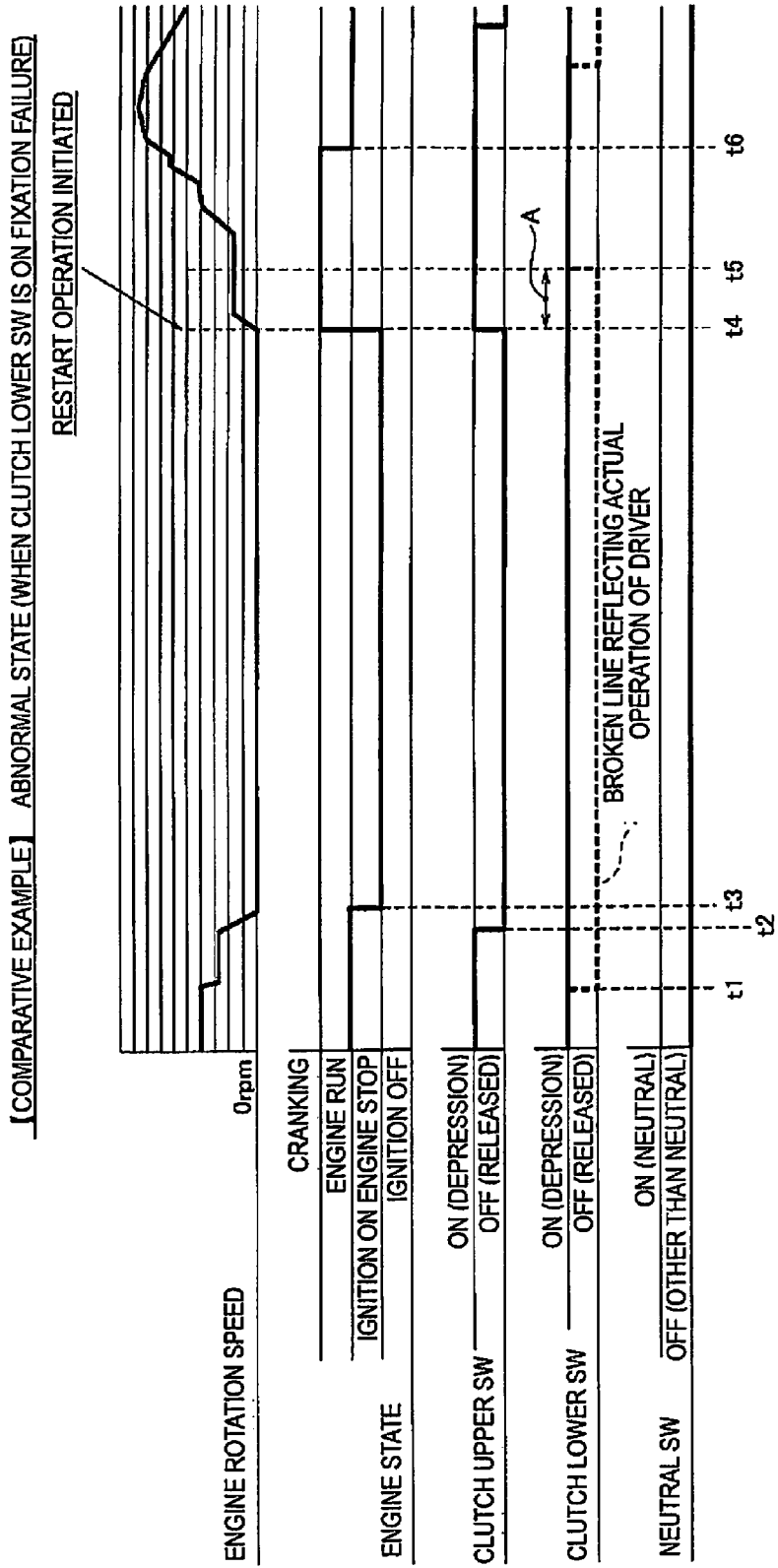
FIG. 6 is a time chart showing respective characteristics including an engine rotation speed, an engine state, a clutch upper SW, a clutch lower SW, and a neutral SW in Comparative Example of the manual transmission equipped vehicle.

In the Comparative Example, a description is given of the engine restart control operation at the time of abnormality (clutch lower switch is subject to ON fixation failure) with reference to the time chart shown in FIG. 6.

In FIG. 6, time t1 denotes a clutch pedal foot releasing start time, time t2 denotes a clutch pedal foot releasing end time, time t3 denotes an engine stall determination time, time t4 denotes an engine restart start time, time t5 denotes a clutch depression terminating operation end time, and time t6 denotes an engine cranking end time, respectively.

First, until the clutch pedal foot releasing start time t1, as a state in which the clutch pedal is being depressed, a neutral state (power non-transmission state) is in place with the clutch being disconnected. Then, at time t1, when starting the foot releasing operation of the clutch pedal, the clutch is gradually engaged, and the engine speed starts to decrease accordingly.

Subsequently, when completing foot release from the clutch pedal at time t2, it is determined that the engine stalls at time t3 (engine stop). However, since the clutch lower switch is in ON fixation failure, even when an actual foot releasing operation is started at time t1, the signal of the clutch lower switch is maintained ON (being depressed).

Then, after a predetermined time of engine stop time has elapsed from time t3, when the driver starts to depressing on the clutch pedal at time t4, the clutch upper switch produces signal ON indicative of pedal depression start operation. At the time t4 at which the clutch upper switch is turned ON, due to the clutch lower switch being in ON fixation failure, the clutch lower switch continues to output signal ON indicative of the pedal depression terminating operation. In other words, at time t4, with the clutch upper switch and the clutch lower switch being ON, and upon the engine restart conditions being satisfied, the engine restart operation will be initiated.

On the other hand, since the actual driver's operation completes at time t5 of depression terminating operation in which the clutch pedal is stroked to the end position, during a time A period between time t4 and time t5, a time of half-clutch state is present, which is capable of power transmission.

Thus, engine cranking is started at time t4, and due to the half-clutch state from time t4 to time t5, during the time period A between time t4 and t5, the vehicle would start moving in a cranking state.

In particular, when comparing the clutch upper switch and the clutch lower switch, the clutch upper switch is imparted only with the urging force of a return spring of the clutch pedal. In contrast, a large driver operating force acts on the clutch lower switch, when the clutch pedal is depressed strongly, which is likely to invoke the ON fixation failure. Therefore, it is necessary to provide a countermeasure for preventing the vehicle from starting to move at the time of ON fixation failure.

Engine Restart Control Operation at Normal Time

First, a description is given of an engine restart control operation at the time when the clutch upper switch 28 and the clutch lower switch 29 are normal with reference to FIG. 2.

In an engine stopped state which may permit an engine restart when the gear shift position is in a position other than neutral position, in the flowchart of FIG. 2, control proceeds through step S1, step S2, step S3, step S4 to step S5. In step S5, based on a switch signal of the clutch upper switch 28, it is determined whether or not the foot released state (OFF state) has been switched to the pedal depression start operation state (ON state). Further, when the change from OFF to ON in step S5 due to the pedal depression start operation is determined, control proceeds to step S6. In step S6, based on the switch signal of the clutch lower switch 29, it is determined whether or not the pedal depression halfway operation state (OFF) is in progress. Further, in step S6 when the pedal depression halfway operation state is determined, control proceeds to next step S7, where the engine restart permission flag permitting for restart of the engine 1 is rewritten from the engine restart permission flag=OFF to the engine restart permission flag=ON.

After being rewritten to the engine restart permission flag=ON in step S7, until the time at which the pedal stepping depression terminating operation state is reached due to the stroke operation to the end position, the determination of the pedal depression halfway state (OFF state) is determined in step S9. Therefore, the process proceeds from step S7 through step S8 and step S9 to the end and from the next control cycle on, the flow is repeated in which control proceeds from step S1 through step S2, step S3, step S4, and step S8 to step S9. In step S9, when it is determined that the pedal depression terminating operation is changed from OFF to ON, control proceeds to step S10 where the engine is cranked for starting restart by outputting a motor drive command to the starter motor 2. In the next step S11, the engine restart permission flag that has been set ON in step S7 is rewritten to OFF and initialized so that the engine restart control in the normal state.

A description will now be made of a case in which, although the clutch pedal 12 has been started to be depressed, a returning operation is performed from the middle of the depression stroke. When this retuning operation is performed, in step S8, based on the switch signal of the clutch upper switch 28, it is determined whether or not the pedal depression start operation state (ON) has been switched to the foot released sate (OFF state). Further, when the switch from ON to OFF due to pedal returning operation is determined in step S8, control proceeds to step S15 where the engine restart permission flag is rewritten from ON to OFF. Thus, from the next control cycle, again, control proceeds from step S1 through step S2, step S3, step S4, and step S5 to step S6.

A further description is given of a case in which, although the clutch pedal 12 has been started to be depressed, a driver's shift operation to change gear shift position to the neutral position is intervened prior to the engine restart. In the case of intervening of shift operation, in a first control cycle after the shift operation intervention, control proceeds from step S1 through step S2 and step S3 to step S11. That is, when the neutral position is determined in step S2, control proceeds directly to step S10 where the engine 1 is cranked for starting restart by outputting a motor drive command to the starter motor 2.

Figure 7:
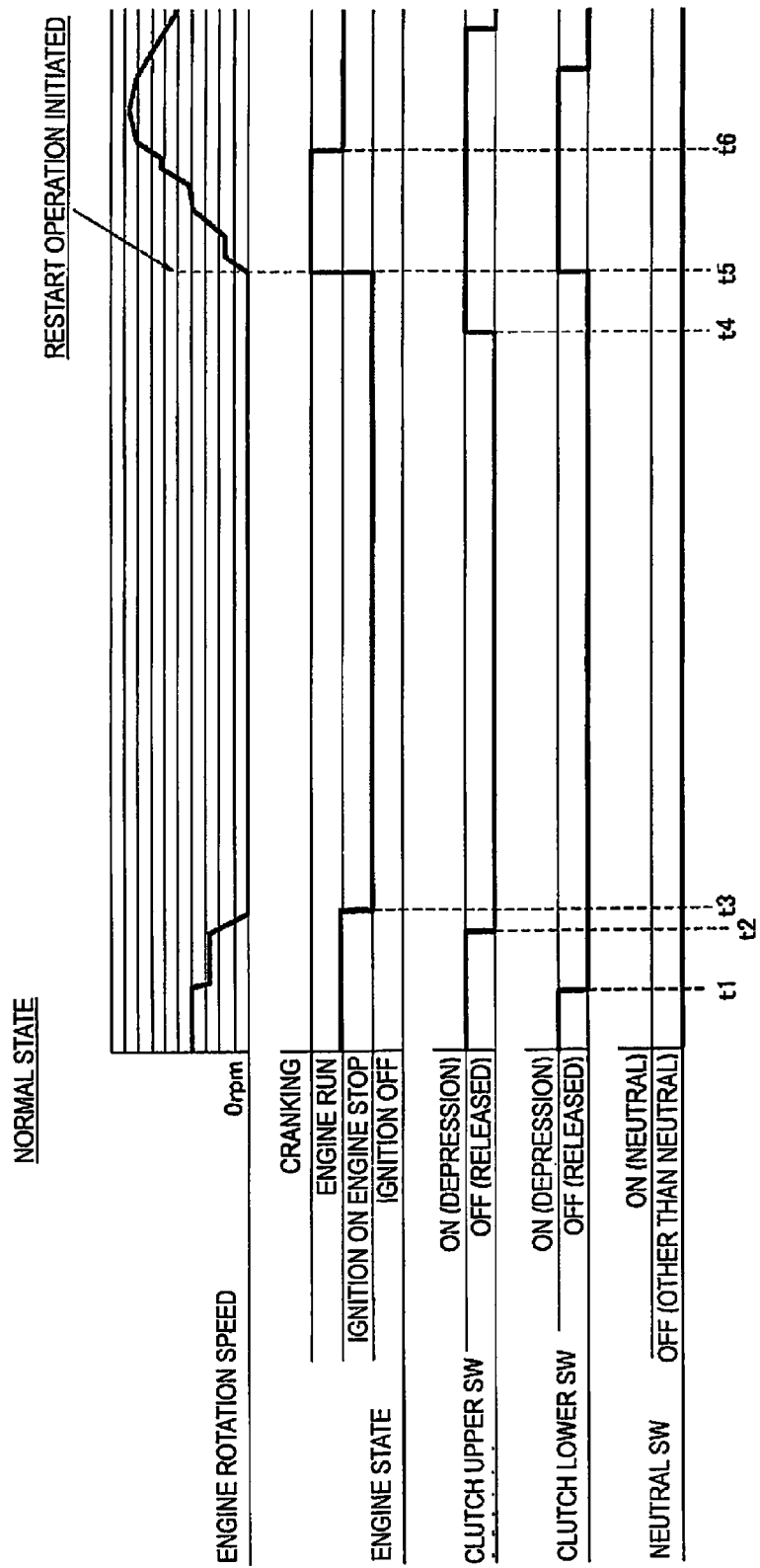
FIG. 7 is a time chart showing respective characteristics including an engine rotation speed, an engine state, a clutch upper SW, a clutch lower SW, and a neutral SW in the first embodiment of the manual transmission equipped vehicle.

Now, a description is given of the engine restart control operation in which the clutch upper switch 28 and the clutch lower switch 29 are both normal and neither the returning operation of the clutch pedal 12 nor the intervening shift operation to the neutral position is performed, with reference to FIG. 7. In FIG. 7, time t1 denotes a clutch pedal foot releasing start time, time t2 denotes a clutch pedal foot releasing end time, time t3 denotes an engine stall determination time, time t4 denotes a clutch pedal depression start time, time t5 denotes a clutch depression terminating operation end time (=engine restart start time), and time t6 denotes an engine cranking end time, respectively.

First, until the start time t1 of the clutch pedal foot releasing start, in a depression state of the clutch pedal 12, by disconnecting the clutch 31, a neutral state (power non-transmission state) is in place. Then, when starting the foot releasing operation of the clutch pedal 12 at time t1, the clutch 31 is gradually engaged, and the engine rotation speed starts to decrease accordingly.

Subsequently, when ending foot release from the clutch pedal 12, at time t3, an engine stall (engine stop) is determined. Then, with the elapse of a predetermined time, the engine restart permission flag is rewritten from OFF to ON. In addition, when the driver proceeds in clutch stroke operation, at time t5, in response to completion of depression terminating operation to stoke the clutch pedal to the end position, the clutch lower switch 29 is switched from the pedal depression halfway operation state (OFF state) to the pedal depression terminating operation state (ON). Thus, at the time t5, restart of the engine is started by cranking.

Thus, when the clutch upper switch 28 and the clutch lower switch 29 are normal, in response to the clutch pedal operation to release the clutch 31 disposed in the drive system, a response sequence is performed in which the clutch upper switch 28 previously responds (at time t4) and the clutch lower switch 29 responds with a delay (at time t5). Thus, at time t5 in which the clutch lower switch 29 responds, it is confirmed that the clutch 31 is in a released state (=power non-transmission state). Therefore, even when the engine restart operation has been permitted at time t4 at which the clutch upper switch 28 responds and the engine cranking is started at time t5 at which the clutch lower switch 29 responds, the vehicle would not start to move.

Engine Restart Control Operation at on Fixation Failure of Clutch Lower Switch

First, a description is given of an engine restart control process when the clutch lower switch 29 is ON fixation failure whereas the clutch upper switch 28 is normal, with reference to FIG. 2.

In an engine stopped state which is capable of permitting an engine restart, when the gear shift position is in a position other than neutral position, in the flowchart of FIG. 2, control proceeds from step S1 through step S2, step S3, step S4 to step S5. In step S5, based on a switch signal of the clutch upper switch 28, it is determined whether or not the foot released state (OFF state) has been switched to the pedal depression start operation state (ON state). When the switch from OFF to ON is determined due to pedal depression start operation in step S5, control proceeds to the next step S6. In step S6, it is determined whether or not the pedal depression halfway operation state (OFF state) is in place based on the switch signal of the clutch lower switch 29. Further, when the pedal depression terminating operation state is determined in step S6, control proceeds to step S14 where the engine restart prohibition flag prohibiting restart of the engine 1 is rewritten from engine restart prohibition flag being OFF to engine restart prohibition flag being ON, and control ends. Thus, in the next control cycle, control of flow is repeated from step S1 through step S2, step S3, step S12 to End. That is, when the clutch lower switch 29 is in ON fixation failure, the engine 1 is prohibited from being restarted, and the engine restart is not initiated by the switch signals from the clutch upper switch 28 and the clutch lower switch 29.

A description is made of a case in which, although the clutch pedal 12 is started to be depressed, a returning operation is performed from the middle of the depression stroke. When performing this return operation, in step S12, based on a switch signal from the clutch upper switch 28, it is determined whether or not the pedal depression start operation state (ON state) has been switched to the foot released state (OFF state). Further, in step S12, when the switch of ON to OFF is determined due to pedal return operation, control proceeds to step S13 where the engine restart prohibition flag is rewritten from ON to OFF. Thus, from the next control cycle, again, control proceeds from step S1 through step S2, step S3, step S4, and step S5 to step S6.

Furthermore, a description is given of a case in which, although a pedal depression operation on the clutch pedal 12 is started, when, before engine restart, a driver's shifting operation to shift the gear shift position to the neutral position is intervened. When the shifting operation is intervened, in a first control cycle after the shift operation intervention, control proceeds from step S1 through step S2, step S10 to step S11. That is, when the neutral position is determined in step S2, control proceeds directly to step S10, and restart is performed by outputting a motor drive command to the starter motor 2 to crank the engine 1.

Figure 8:
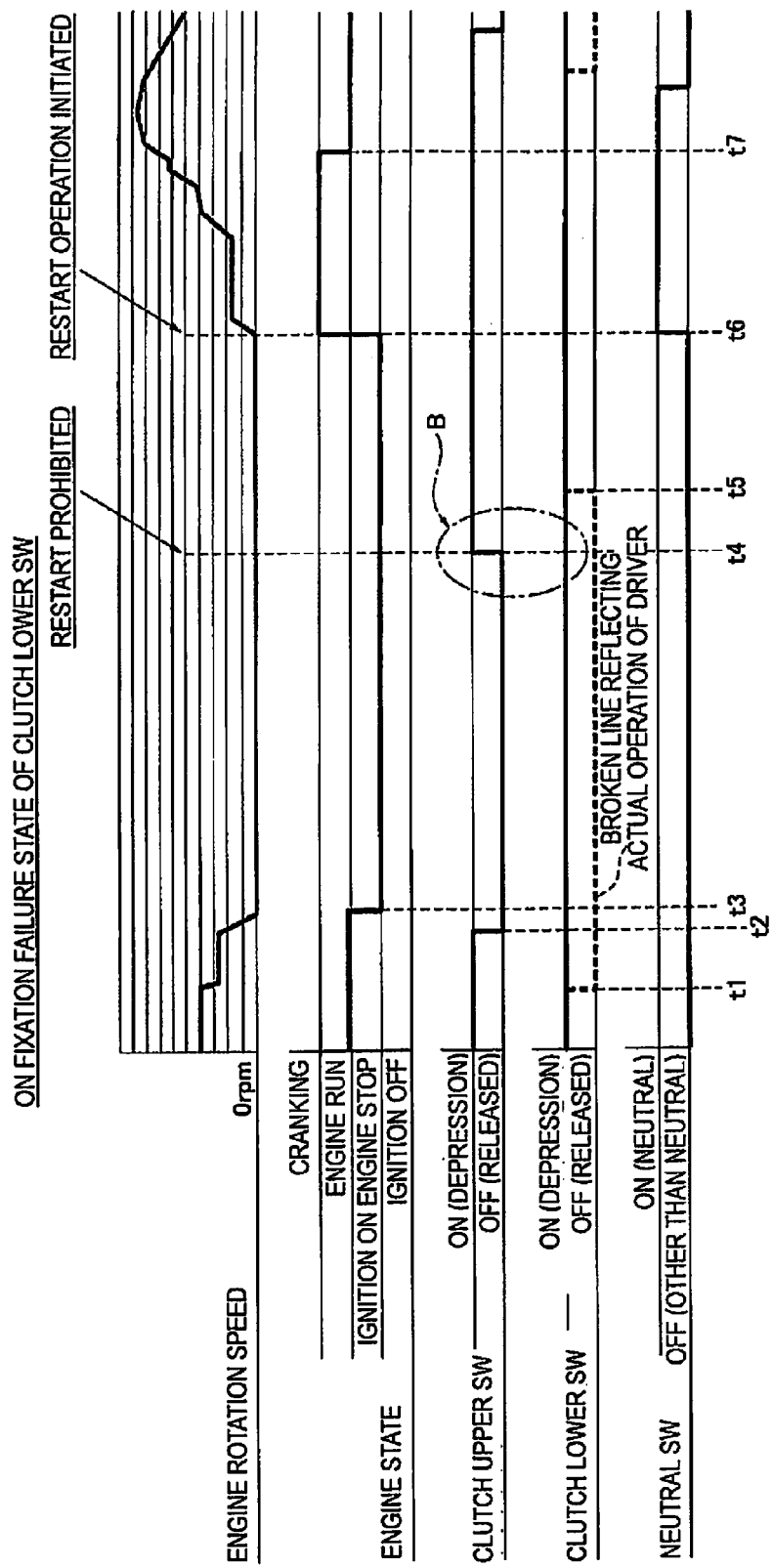
FIG. 8 is a time chart showing respective characteristics including an engine rotation speed, an engine state, a clutch upper SW, a clutch lower SW, and a neutral SW in the first embodiment of the manual transmission equipped vehicle with the clutch lower switch being ON fixed failure.

Now, a description is given of the engine restart control operation in which a shifting operation to the neutral position is intervened at the time of clutch lower switch 29 being in ON fixation failure, with reference to FIG. 8.

In FIG. 8, time t1 denotes a clutch pedal foot release start time, time t2 denotes a clutch pedal foot release end time, time t3 starts an engine stall determination time, time t4 denotes an engine restart prohibition time, time t5 denotes a clutch pedal depression terminating operation end time, and time t6 denotes an engine restart start time (=shift operation time to the neutral position), and time t7 denotes an engine cranking end time, respectively.

First, until the clutch pedal foot release start time t1, by placing the clutch pedal 12 in a depressed state with the clutch 31 disconnected, a neutral state (power non-transmission state) is in place. Then, when starting the foot release operation of the clutch pedal 12 at time t1, the clutch 31 is gradually engaged, and the engine speed starts to decrease accordingly.

Further, when ending foot release from the clutch pedal 12 at time t2, engine stall (engine stop) is determined at time t3. However, since the clutch lower switch 29 is ON fixation failure, at time t1, even when the foot release operation is actually initiated from the clutch pedal 12, the signal determination of the clutch lower switch is maintained ON (depression).

Then, with elapse of a predetermined engine stop time from time t3, when the driver starts the depression of the clutch pedal 12 at the time t4, the clutch upper switch 28 switches from the foot released state (OFF state) to the pedal depression start operation state (ON state). At time t4 in which the clutch upper switch 29 switched from OFF to ON, since the clutch lower switch 29 is in ON fixation failure, an ON signal is continued to be output from the clutch lower switch 29 indicating a pedal depression terminating operation. That is, as shown in a frame indicated by arrow B in FIG. 8, when the clutch upper switch 28 is switched from ON to OFF at time t4, since the clutch lower switch 29 is ON (depression), the engine restart prohibition flag is switched from the engine restart prohibition flag being OFF to the engine restart prohibition flag being ON.

Then, when reaching time t5 after the elapse of a predetermined time from time t4, an actual depression terminating operation by the driver by stroking (pressing) the clutch pedal 12 to the end position is completed. Then, at time t6 with the elapse of a predetermined time from time t5, when the driver performs a shifting operation to place the gear shift position to the neutral position, at the timing of time t6, a restart is initiated to crank the engine 1.

Thus, when the clutch lower switch 29 is ON, fixation failure, engine restart using two switching signals of the clutch upper switch 28 and the clutch lower switch 29 is prohibited. Alternatively, when the power non-transmission state is confirmed in the gear shifting mechanism 32 side by shifting operation by the driver to place the gear shift position to the neutral position, engine restart is initiated. Thus, even when engine cranking is initiated at time to in which the neutral position is selected, the vehicle will not start to move.

Characteristic Operation of Engine Restart Control

As described above, in the first embodiment, when the engine 1 is in a stopped state, and a switch signal from the clutch upper switch 28 switches from a foot released state indicative signal (OFF state) to the pedal depression start operation indicative signal (ON state), in response to detection a switch signal (ON) of the clutch lower switch 29 indicating the pedal depression terminating operation, the restart of the engine 1 is prohibited.

That is, when the clutch upper switch 28 and the clutch lower switch 29 are normal, in response to a clutch pedal operation to release the clutch 31 disposed in the drive system, such a control sequence occurs in which, after the clutch upper switch 28 responds first, the clutch lower switch 29 responds with a delay. Therefore, when, at the response time of the clutch upper switch 28, a switching signal (ON) indicative of the pedal depression terminating operation is detected by the clutch lower switch 29, it may be determined that the clutch lower switch is ON failure and the normal switching state transition is out of place. Thus, based on the ON failure determination of the clutch lower switch 29, which is focused on the response order of the two switches 28 and 29, it is possible to prohibit restart of the engine 1 to thereby prohibit the vehicle from starting to move by engine cranking in a power transmission enabling, half-clutch state.

As a result, at the time of ON failure of the clutch lower switch 29, it is possible to prevent the vehicle from starting to move even when the driver places the clutch in a half-clutch state. In addition, without using additional sensors such as a clutch stroke sensor, it is possible to determine the engagement/semi engagement/disengagement (released) state of the clutch 31.

In the first embodiment, when the switch signal from the clutch upper switch 28 detects switching from the foot released state indicative signal (OFF) to the pedal depression start operation indicative signal (ON), if the switch signal (OFF) of the clutch lower switch 29 indicates pedal depression halfway operation, restart of the engine 1 is permitted. Further, after having determined the engine start permission, the switch signal from the clutch upper switch 28 is monitored. When switching of the switch signal from the pedal depression start operation indicative signal (ON) to the foot released state indicative signal (OFF) is detected, the determination result of the engine start permission is configured to be released.

For example, with an initial determination of engine start permission after the engine is stopped, if the engine start permission is maintained irrespective of subsequent driver operations, even if the clutch pedal 12 is operated to be returned, new determination of engine start permission/prohibition would not be made. Therefore, after the determination of the engine start permission when the clutch lower switch 29 is turned ON temporarily due to, for example, foreign objects, the engine 1 is restarted at the moment of ON, and the vehicle starts moving depending on the state of the clutch 31.

In contrast, when performing return operation of the clutch pedal 12 after the determination of engine start permission, by newly performing the determination of the engine start permission/prohibition, it is possible to prevent the vehicle from starting to move when the clutch lower switch 29 falls into a temporary ON failure.

In the first embodiment, after determining the engine start prohibition, the switch signal from the clutch upper switch 28 is monitored, and when the switch signal detects switching to the foot released state indicative signal (OFF) from the pedal depression start operation indicative signal (ON), the determination result of the engine start prohibition is configured to be released.

For example, with an initial determination of engine start prohibition after the engine is stopped, if the engine start prohibition is maintained irrespective of subsequent driver operations, even if the clutch pedal 12 is operated to be returned, a new determination of engine start permission/prohibition would not be made. Therefore, after the determination of the engine start prohibition when the clutch lower switch 29 is turned ON temporarily due to foreign objects, for example, the clutch lower switch 29 may return to normal state with the foreign objects and the like being removed.

In contrast, when performing a return operation of the clutch pedal 12 after the determination of engine start prohibition, by newly performing the determination of the engine start permission/prohibition, it is possible to make the engine start permission determination using the clutch upper switch 28 and the clutch lower switch 29 when the clutch lower switch 29 recovers from the temporary ON failure to normal.

In the first embodiment, in an engine stopped state which can allow the engine to start with the manual transmission 3 in power transmission enabling state in a shift position other than the neutral position, it is configured such that determination processing of the engine 1 restart permission/start prohibition can be performed.

The manual transmission 3 includes a clutch 31 and a gear transmission mechanism 32, and, when the gear transmission mechanism 32 is in the neutral position, thus with a power non-transmission state, the determination of the engagement/semi engagement/disengagement state of the clutch 31 is not be required.

In contrast, by including the determination that the manual transmission 3 is in the power transmission enabling state in a position other than the neutral position in to the determination start condition, only a determination is necessary, it is possible to perform the restart permission/start prohibition determination process with respect to the engine 1 using two switches 28, 29.

Now, a description is given of effects.

In the engine start control system for a manual transmission equipped engine vehicle in the first embodiment, it is possible to obtain the following effects.

(1) An engine start control system for a vehicle equipped with a manual transmission (automatic transmission equipped engine vehicle) comprising:

a manual transmission 3 having a clutch 31 for interrupting power transmission to the drive wheels 7 from the engine 1 by depressing a clutch pedal 12;

a clutch upper switch 28 that detects a pedal depression start operation to foot resting on the clutch pedal from foot released state with clutch pedal 12;

a clutch lower switch 29 that detects a pedal depression terminating operation when the clutch pedal is stroked to an end position of the clutch pedal 12;

an engine start control unit (engine control module 20, step S8→S9→S10) that starts the engine 1 in the stopped state of the engine 1 when a switch signal of the clutch upper switch 28 indicates a pedal depression start operation indicative signal (ON) and a switch signal of the clutch lower switch 29 indicates a pedal depression terminating operation (ON), wherein the engine start control unit (engine control module 20) is configured such that, when the switch signal of the clutch upper switch 28 indicates switching from the foot released state indicative signal (OFF) to the pedal depression start operation indicative signal (ON), in response to detection of a switch signal (ON) of the clutch lower switch 29 that indicates a pedal depression terminating operation, start of the engine 1 is prohibited (steps S5→S6→S14).

Therefore, it is possible to prevent the vehicle from starting to move even in response to a half-clutch state brought about by the driver at the time of clutch ON failure.

(2) The engine start control unit (engine control module 20) is configured such that, when the switch signal from the clutch upper switch 28 detects switching from the foot released state indicative signal (OFF) to a pedal depression start operation indicative signal, in response to detection of a switch signal that indicates a pedal depression halfway operation by the clutch lower switch 29, the engine restart is permitted (step S5→S6→S7), while, after determination of the engine start permission, the switch signal of the clutch upper switch 28 is monitored, and in response to detection of switching from the pedal depression start operation indicative signal (ON) to the foot released state indicative signal (OFF), the determination result of the engine start permission is released or cleared (step S8→S15). Therefore, in addition to the effect of (1), after the determination of the engine start permission, when performing return operation of the clutch pedal 12, by newly performing the determination of the engine start permission/prohibition, it is possible to prevent the vehicle from starting to move even when the clutch lower switch 29 falls to ON failure, temporarily.

(3) The engine start control unit (engine control module 20) is configured such that, after determining the engine start prohibition, the switch signal from the clutch upper switch 28 is monitored, and in response to the detection of switching from the pedal depression start operation indicative signal (ON) to the foot released state indicative signal (OFF), the determination of the engine start prohibition will be released or cleared (step S3→S12→S13).

Therefore, in addition to the effect of (1) or (2), after the determination of the engine start prohibition, when performing a returning operation of the clutch pedal 12, by newly performing the determination of the engine start permission/start prohibition, when the clutch lower switch 29 returns to normal from the temporary ON failure, it is possible to make the determination of the engine start permission using the clutch upper switch 28 and the clutch lower switch 29.

(4) A neutral detection device (neutral switch 27) detects whether or not the manual transmission 3 is in the neutral position, wherein the engine start control unit (engine control module 20) is configured such that, in the engine stopped state in which the engine may start (YES in step S1) and the manual transmission 3 is in power transmission enabling state in a position other than the neutral position (YES in step S2), the determination process of the start permission/start prohibition of the engine 1 is performed (steps S3 to S15) (FIG. 2).

Therefore, in addition to the effect of (1) to (3), by including in the determination start condition the state in which the manual transmission 3 is in a position other than the neutral position in which power transmission is available, only when necessary for determination, it is possible to perform the determination process of restart permission/start prohibition of the engine 1 using two switches 28, 29.

As described, although the engine start control system for a manual transmission equipped vehicle according to the present invention based on the first embodiment, the specific configuration is not limited to the first embodiment. Rather, without departing from the gist of the invention pertaining to each claim, design changes and additions are acceptable.

For example, in the first embodiment, an example is shown in which the manual transmission equipped vehicle is an engine vehicle with a manual transmission and the engine start control according to the present invention is applied for engine restart from the engine stop determination condition. However, the engine start control according to the present invention is applicable to a situation in which the manual transmission mounted vehicle is a manual transmission equipped engine vehicle that performs an automatic engine stop control such as coast stop/idling stop controls and engine is restarted from an engine stopped state due to execution of the automatic engine stop control.

The engine start control according to the present invention is also applicable to a situation in which the manual transmission mounted vehicle is a manual transmission equipped engine vehicle without an automatic engine stop control and the engine is restarted from an engine stopped state due to driver's false operation.

Further, the engine start control according to the present invention is applicable to a situation in which the manual transmission mounted vehicle is a hybrid vehicle with a manual transmission of motor assisted type and the engine is started at vehicle start using a driving motor.

Yet further, the engine start control according to the present invention is applicable to a situation in which the manual transmission mounted vehicle is a hybrid vehicle of parallel type in which, associated with mode change from EV running mode to HEV running mode, when the stopped engine will be started by a starter motor or a driving motor.

The invention claimed is:

1. An engine start control system for a vehicle, comprising:
    a manual transmission having a clutch configured to interrupt power transmission to drive wheels from an engine by depression of a clutch pedal;
    a clutch upper switch configured to detect a pedal depression start operation by detecting a resting foot state on the clutch pedal from a foot released state from the clutch pedal;
    a clutch lower switch configured to detect a pedal depression terminating operation when the clutch pedal is depressed to an end position of the clutch pedal; and
    an engine start control unit configured to start the engine from a stopped state of the engine when a switch signal of the clutch upper switch indicates the pedal depression start operation and a switch signal of the clutch lower switch indicates the pedal depression terminating operation, and the engine start control unit being configured to prohibit starting of the engine, when the switch signal of the clutch upper switch indicates switching from the foot released state to the pedal depression start operation, in response to detection of the switch signal of the clutch lower switch indicating the pedal depression terminating operation.

2. The engine start control system for a vehicle as claimed in claim 1, wherein the engine start control unit is configured to permit an engine restart, when the switch signal from the clutch upper switch indicates switching from the foot released state to the pedal depression start operation, in response to detection of the switch signal from clutch lower switch indicating a pedal depression halfway operation, and, after permitting the engine restart, the engine start control unit is configured to monitor the switch signal of the clutch upper switch, and in response to detection of switching from the pedal depression start operation to the foot released state, to release the permitting the engine restart.

3. The engine start control system for a vehicle as claimed in claim 1, wherein the engine start control unit is configured to, after prohibiting the engine start, monitor the switch signal from the clutch upper switch, and in response to detection of switching from the pedal depression start operation to the foot released state, release the prohibiting the engine start.

4. The engine start control system for a vehicle as claimed in claim 2, further comprising a neutral detection device configured to detect whether the manual transmission is in a neutral position or in a power transmission enabling state, and the engine start control unit is configured to, when the engine is in the engine stopped state and the manual transmission is in the power transmission enabling state, perform a determination of whether the engine is permitted to restart.

5. The engine start control system for a vehicle as claimed in claim 2, wherein the engine start control unit is configured to, after prohibiting the engine start, monitor the switch signal from the clutch upper switch, and in response to detection of switching from the pedal depression start operation to the foot released state, release the prohibiting the engine start.

6. The engine start control system for a vehicle as claimed in claim 5, further comprising a neutral detection device configured to detect whether the manual transmission is in a neutral position or in a power transmission enabling state, and the engine start control unit is configured to, when the engine is in the engine stopped state and the manual transmission is in the power transmission enabling state, perform a determination of whether the engine is permitted to restart.

* * * * *